US012400137B1

(12) United States Patent
Vivekraja et al.

(10) Patent No.: US 12,400,137 B1
(45) Date of Patent: Aug. 26, 2025

(54) BIDIRECTIONAL NETWORK ON A DATA-FLOW CENTRIC PROCESSOR

(71) Applicant: Amazon Technologies, Inc., Seattle, WA (US)

(72) Inventors: Vignesh Vivekraja, Santa Clara, CA (US); Randy Renfu Huang, Morgan Hill, CA (US); Jiading Gai, Seattle, WA (US); Thiam Khean Hah, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1077 days.

(21) Appl. No.: 16/588,931

(22) Filed: Sep. 30, 2019

(51) Int. Cl.
*G06N 5/046* (2023.01)
*G06N 3/08* (2023.01)
*G06N 20/00* (2019.01)

(52) U.S. Cl.
CPC .............. *G06N 5/046* (2013.01); *G06N 3/08* (2013.01); *G06N 20/00* (2019.01)

(58) Field of Classification Search
CPC ........... G06N 5/046; G06N 3/08; G06N 20/00
See application file for complete search history.

(56) References Cited

U.S. PATENT DOCUMENTS

| 10,210,860 | B1* | 2/2019 | Ward | G10L 25/18 |
| 10,733,506 | B1* | 8/2020 | Ogale | G06N 3/084 |
| 2016/0292567 | A1* | 10/2016 | George | G06N 3/047 |
| 2017/0061328 | A1* | 3/2017 | Majumdar | G06K 9/6232 |
| 2019/0206020 | A1* | 7/2019 | Ould-Ahmed-Vall | G06F 9/3863 |
| 2020/0210839 | A1* | 7/2020 | Lo | G06F 9/5027 |
| 2020/0293770 | A1* | 9/2020 | Chen | G06N 3/045 |
| 2020/0294287 | A1* | 9/2020 | Schlemper | G06V 10/431 |

OTHER PUBLICATIONS

Khorasani et al. "In-Register Parameter Caching for Dynamic Neural Nets with Virtual Persistent Processor Specialization", Dec. 13, 2018 51st Annual IEEE (Year: 2018).*
Zhang et al. "Relation classification via recurrent neural network with attention and tensor layers", vol. 1, No. 3, pp. 234-244, Sep. 2018 (Year: 2018).*

(Continued)

*Primary Examiner* — Michael J Huntley
*Assistant Examiner* — Imad Kassim
(74) *Attorney, Agent, or Firm* — Kilpatrick Townsend & Stockton LLP

(57) ABSTRACT

Techniques for implementing bidirectional networks, such as bidirectional recurrent neural networks (RNNs), on data-flow centric processors are disclosed. An input to a bidirectional network is provided. The bidirectional network includes a forward network and a reverse network. The forward network performs a set of operations in a forward direction and the reverse network performs the set of operations in a reverse direction. A forward output is generated using the forward network based on the input. A first transformation is performed on the input to generate a transformed input. A reverse output is generated using the reverse network based on the transformed input. A second transformation is performed on the reverse output to generate a transformed output. The forward output and the transformed output are combined to produce an overall output.

17 Claims, 15 Drawing Sheets

(56) References Cited

OTHER PUBLICATIONS

Kitza et al. ("Comparison of BLSTM-Layer-Specific Affine Transformations for Speaker Adaptation", Interspeech 2018) (Year: 2018).*
Yokota et al ("Missing Slice Recovery for Tensors Using a Low-rank Model in Embedded Space", IEEE, 2018, pp. 8251-8259) (Year : 2018).*
Chien et al. ("NPL, Tensor-Factorized Neural Networks", IEEE, vol. 29, No. 5, May 2018) (Year: 2018).*
Zhang et al. ("Relation Classification via Recurrent Neural Network with Attention and Tensor Layers", pp. 234-244 vol. 1, No. 3, Sep. 2018) (Year: 2018).*

* cited by examiner

400A

| Left-to-Right Layer | | | | | |
|---|---|---|---|---|---|
| | Iteration = 0 | Iteration = 1 | Iteration = 2 | | Iteration = N-1 |
| Input State | Initial LR State | LR State[0] | LR State[1] | ... | LR State[N-2] |
| Input | Input[0] | Input[1] | Input[2] | ... | Input[N-1] |
| Output State | LR State[0] | LR State[1] | LR State[2] | ... | LR State[N-1] |
| Output | LR Output[0] | LR Output[1] | LR Output[2] | ... | LR Output[N-1] |

| Right-to-Left Layer | | | | | |
|---|---|---|---|---|---|
| | Iteration = 0 | Iteration = 1 | Iteration = 2 | | Iteration = N-1 |
| Input State | RL State[1] | RL State[2] | RL State[3] | ... | Initial RL State |
| Input | Input[0] | Input[1] | Input[2] | ... | Input[N-1] |
| Output State | RL State[0] | RL State[1] | RL State[2] | ... | RL State[N-1] |
| Output | RL Output[N-1] | RL Output[N-2] | RL Output[N-3] | ... | RL Output[0] |

| Right-to-Left Layer | | | |
|---|---|---|---|
|  | Iteration = 0 | Iteration = 1 | Iteration = 2 |
| Input State | RL State[1] | Initial RL State |  |
| Input | Input[0] | Input[1] |  |
| Output State | RL State[0] | RL State[1] |  |
| Output | RL Output[1] | RL Output[0] |  |

| Right-to-Left Layer | | | |
|---|---|---|---|
|  | Iteration = 0 | Iteration = 1 | Iteration = 2 |
| Input State | RL State[1] | RL State[2] | Initial RL State |
| Input | Input[0] | Input[1] | 0 |
| Output State | RL State[0] | RL State[1] | RL State[2] |
| Output | RL Output[2] | RL Output[1] | RL Output[0] |

| Output Alignment for N = L | | | | | |
|---|---|---|---|---|---|
| | Iteration = 0 | Iteration = 1 | ... | Iteration = L-2 | Iteration = L-1 |
| LR Output | LR Output[0] | LR Output[1] | ... | LR Output[L-2] | LR Output[L-1] |
| RL Output | RL Output[L-1] | RL Output[L-2] | ... | RL Output[1] | RL Output[0] |
| Merged Output | [LR Output[0] RL Output[L-1]] | [LR Output[1] RL Output[L-2]] | ... | [LR Output[L-2] RL Output[1]] | [LR Output[L-1] RL Output[0]] |

| Output Alignment for N < L and N = 2 | | | | | |
|---|---|---|---|---|---|
| | Iteration = 0 | Iteration = 1 | ... | Iteration = L-2 | Iteration = L-1 |
| LR Output | LR Output[0] | LR Output[1] | ... | | |
| RL Output | | | ... | RL Output[1] | RL Output[0] |
| Merged Output | [LR Output[0] ] | [LR Output[1] ] | ... | [ RL Output[1]] | [ RL Output[0]] |
| Corrected Merged Output | [LR Output[0] RL Output[1]] | [LR Output[1] RL Output[0]] | ... | | |

| Right-to-Left Layer | | | |
|---|---|---|---|
| | Iteration = 2 | Iteration = 1 | Iteration = 0 |
| Input State | | RL State[0] | Initial RL State |
| Input | | RL Input[1] | RL Input[0] |
| Output State | | RL State[1] | RL State[0] |
| Output | | RL Output[1] | RL Output[0] |

FIG. 8

BIDIRECTIONAL NETWORK ON A DATA-FLOW CENTRIC PROCESSOR

BACKGROUND

Artificial neural networks are computing systems with an architecture based on biological neural networks. Artificial neural networks can be trained using training data to learn how to perform a certain task, such as identifying or classifying physical objects, activities, characters, etc., from images or videos. An artificial neural network, such as a deep neural network, may include multiple layers of processing nodes. Each processing node in a layer can perform computations on input data generated by processing nodes in the preceding layer to generate output data. For example, a processing node may perform a set of arithmetic operations such as multiplications and additions to generate an intermediate output, or perform post-processing operations on the intermediate output to generate a final output. An artificial neural network may include thousands or more of processing nodes and millions or more of parameters.

The architecture of a neural network may include an input layer, an output layer, and a number of intermediate layers, often referred to as hidden layers. Each layer executes a computation on the outputs of the previous layer, with the last layer (the output layer) providing a final result. With more layers, a neural network can, theoretically, perform more complex tasks, such as language translations and identifying (or classifying) the contents of an image. A neural network with more than three hidden layers is sometimes referred to as a deep neural network. Deep neural networks can have many hidden layers, such as, for example, between five and more than a thousand layers.

Neural networks can be implemented using a central processing unit (CPU) to perform the computations. CPUs, however, tend to be optimized for sequential rather than parallel computations, and thus can suffer from poor response times. Graphics processing units (GPUs) are optimized for parallel computations, but not necessarily for the result from one computation unit to be provided directly to another computation unit. Often, the result must first be written to a memory and then read back. Although GPUs can have better response times than CPUs, it would still be desirable to improve the execution time of a neural network. Recently, special-purpose processors, such as neural network accelerators, have been developed to execute neural networks more efficiently than either CPUs or GPUs.

BRIEF DESCRIPTION OF THE DRAWINGS

Various embodiments in accordance with the present disclosure will be described with reference to the drawings, in which:

FIGS. 4A and 4B illustrate tables that show the input states, input values, output states and output values for a bidirectional RNN layer;

FIGS. 5A and 5B illustrate tables that show the input states, input values, output states and output values for a bidirectional RNN layer;

FIGS. 7A and 7B illustrate tables that show the input states, input values, output states and output values for a bidirectional RNN layer;

FIG. 8 illustrates a table that shows the input states, input values, output states and output values for a bidirectional RNN layer;

DETAILED DESCRIPTION

Figure 1:
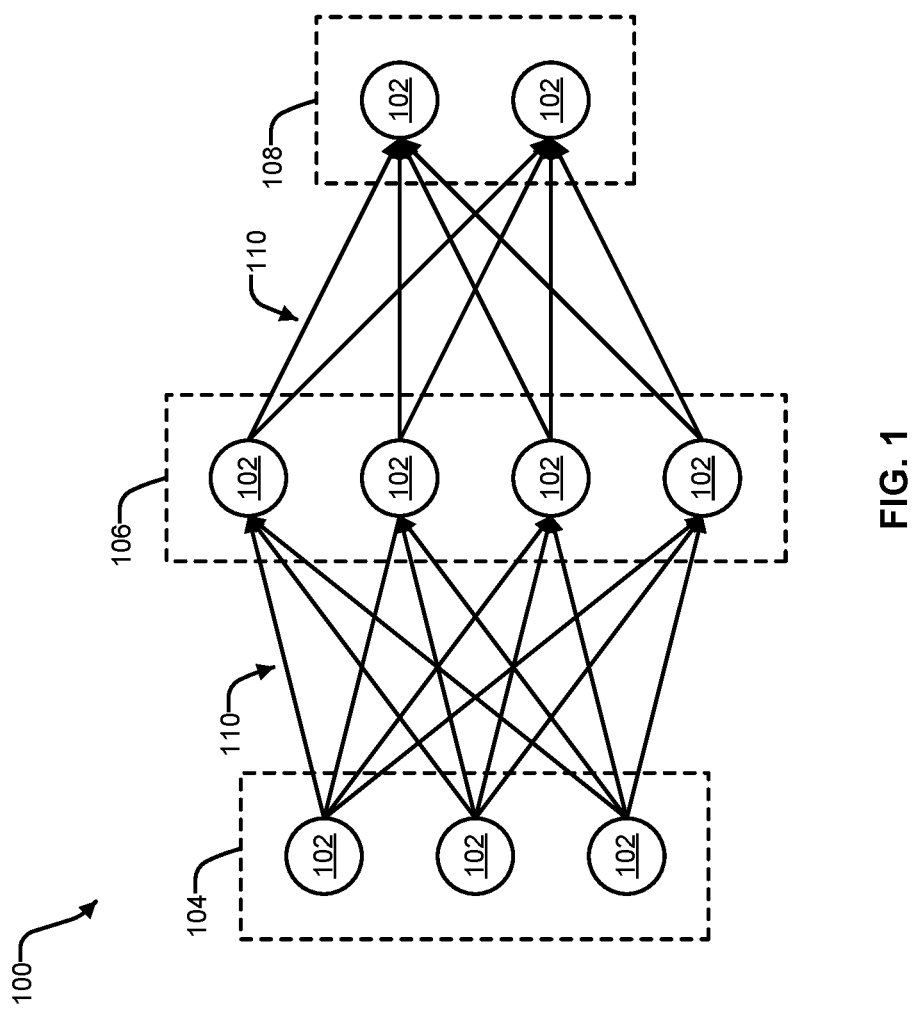
FIG. 1 illustrates an example of a computational flow model for a neural network.

For some types of neural networks, such as recurrent neural networks (RNNs), the operations performed by a particular layer or node are repeated multiple times, each time with different input data and/or different input states. During each iteration, the input data and/or the input state of a layer or node may be altered based on the output data and/or output state from the previous iteration. Such neural networks may be represented with a data flow graph having a feedback loop that indicates that the output data and/or output state from a particular layer/node is fed back as the input data and/or input state for the particular layer/node. The number of iterations that are performed on the set of operations may be static or dynamic, as dictated by the control flow of the neural network. For example, the number of iterations may be static if the set of operations are implemented in a "for" loop with no break conditions. In contrast, the number of iterations may be dynamic if the set of operations are implemented in a "while" loop or in a "for" loop with break conditions, among other possibilities.

Many processors, such as single instruction multiple data (SIMD) processors, do not have a runtime ability to control a sequence length, and as such do not directly support the execution of neural networks with dynamic lengths. However, several techniques have been introduced to adapt these processors to accommodate certain types of dynamic length neural networks. For example, for execution of simple RNNs, such as unidirectional RNNs, one solution has been to execute a maximum number of iterations, regardless of the actual length of the input, and to zero pad the input for each iteration between the actual length of the input and the maximum length. Because the output may also have the maximum length, values of the output between the actual length and the maximum length of the output are ignored by consumers of the output.

While such a solution has been useful for adapting data-flow centric processors for execution of unidirectional RNNs, bidirectional RNNs have more complex structures and pose different problems. Bidirectional RNNs typically consist of two unidirectional RNNs arranged in opposite directions, one in the forward direction (e.g., positive time direction) and one in the reverse direction (e.g., negative time direction). The outputs from each of the oppositely arranged unidirectional RNNs are combined to form an overall output. Due to the arrangement of the bidirectional RNN, zero padding one or both of the inputs fed into the unidirectional RNNs will cause the bidirectional RNN to render an erroneous output. As such, new methods, systems, and other technique are needed.

Embodiments described herein overcome the above-noted inability of data-flow centric processors to execute bidirectional RNNs by providing techniques for modifying (e.g., realigning) the tensors fed into and/or produced by the bidirectional RNNs at various stages/layers within the bidirectional RNNs. Such modifications may be considered a modification of the bidirectional RNN itself with additional layers, or a modification of the data being operated on by the bidirectional RNN. In some embodiments, two transformation layers are added to the bidirectional RNN structure. The first transformation layer may be added to the input that feeds the reverse unidirectional RNN. The first transformation layer may reverse the order of a first set of elements of the input and zero pad the input to a maximum length. The second transformation layer may be added to the output of the reverse unidirectional RNN before the output combiner. The second transformation layer may reverse the order of a second set of elements of the output and overwrite the output values after the second set of elements with zeros.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of a computational flow model 100 for a neural network. Neural networks take inspiration from the mechanics of the operation of the human brain. According to various models of the brain, the main computational element of the brain is the neuron. Neurons are connected together with a number of elements, with elements entering a neuron being referred to as dendrites and an element leaving a neuron being referred to as an axon. A neuron accepts signals via dendrites, performs a computation on the signals, and outputs a signal on an axon. The input and output signals are referred to as activations. The axon of one neuron can branch out and be connected to the dendrites of multiple neurons. The connection between a branch of an axon and a dendrite is called a synapse.

A synapse can scale the signal crossing the synapse. The scaling factor is referred to as a weight, and is thought of as the way a brain is able to learn: different weights result from different responses to input. Learning can change the weights, but the organization of the neurons and synapses need not change to obtain the learning. The static structure of the brain can thus be used as a model for a program, and the weights can reflect tasks that the program has learned to perform.

Neural networks operate on the notion that a neuron's computation involves a weighted sum of input values. These weighted sums correspond to the value scaling performed by the synapses and the combining of those values in the neuron. A functional operation is performed in the neuron on the combined inputs. In the brain model, the operation appears to be a non-linear function that causes the neuron to generate an output only when the inputs cross some threshold. Thus, by analogy, the nodes of a neural network can apply a non-linear function to the weighted sum of the values input into the nodes.

In the illustrated example, the model 100 includes an input layer 104, a middle layer that is often referred to as a hidden layer 106, and an output layer 108. Each layer includes some number of nodes 102. In this example, the nodes 102 of the input layer 104 are connected to each node 102 of the hidden layer 106. The connections, which would be referred to as synapses in the brain model, are referred to as weights 110. Also in this example, each node 102 of the hidden layer 106 has a connection or weight 110 with each node 102 of the output layer. The input layer 104 can receive inputs and can propagate the inputs to the hidden layer 106. A neural network implementation can include multiple hidden layers. Weighted sums computed by the hidden layer 106 (or multiple hidden layers) are propagated to the output layer 108, which can present final outputs to a user. The outputs of the nodes 102 can be referred to as activations, in keeping with the brain model.

An example of a computation that can occur at each layer in the example model 100 is as follows:

$$y_j = f\left(\sum_{i=1}^{3} W_{ij} \times x_i + b\right)$$

In the above equation, $W_{ij}$ is a weight, xi is an input activation, $y_j$ is an output activation, f( ) is a non-linear function, and b is a bias term. Various non-linear functions can be used to achieve different purposes.

The model 100 can be referred to as a directed, weighted graph. In a directed graph, each connection to or from a node indicates a direction (e.g., into the node or away from the node). In a weighted graph, each connection can have a weight. Tools for developing neural networks can visualize the neural network as a directed, weighted graph, for ease of understanding and debuggability. In some cases, these tools can also be used to train the neural network and output trained weight values. Executing the neural network is then a matter of using the weights to conduct computations on input data.

Neural networks with many layers can be capable of learning high-level features having more complexity and abstraction than shallower networks. As an example, a neural network can be taught to recognize images. In this example, pixels of an image can be fed into the input layer of the neural network, and the outputs of the first layer can indicate the presence of low-level features in the image, such as lines and edges. At subsequent layers, these features can be combined to measure the likely presence of higher level features: the lines can be combined into shapes, which can be further combined into sets of shapes. Given all this information, the neural network can output a probability that the high-level features represent a particular object or scene. For example, the neural network can output whether an image contains a cat or does not contain a cat.

The learning phase of a neural network is referred to as training the neural network. During training, the neural network is taught to perform a task. In learning the task, values for the weights (and possibly also the bias) are determined. The underlying program for the neural network (e.g., the organization of nodes into layers, the connections between the nodes of each layer, and the computation executed by each node), does not need to change during training. Once trained, the neural network can perform the task by computing a result using the weight values that were determined during training. For example, the neural network can output the probability that an image contains a particular object, can output the probability that an audio sequence contains a particular word, can generate a bounding box around an object in an image, or can propose an action that should be taken, etc. Running the program for the neural network is referred to as inference.

There are multiple ways in which weights can be trained. One method is called supervised learning. In supervised learning, all training samples are labeled, so that inputting each training sample into a neural network produces a known result. Another method is called unsupervised learning, where the training samples are not labeled and training aims to find a structure in the data or clusters in the data. Semi-supervised learning falls between supervised and unsupervised learning. In semi-supervised learning, a subset of training data is labeled. The unlabeled data can be used to define cluster boundaries and the labeled data can be used to label the clusters.

Neural networks have been used for a variety of applications, including, for example, in the areas of image and video, speech and language, medicine, game play, and robotics. In image and video, neural networks have been used for image classification, object localization and detection, image segmentation, and action recognition. In speech and language, neural networks have been used for speech recognition, machine translation, natural language processing, and audio generation. In the medical field, neural networks have been used in genomics and medical imaging. In game play, neural networks have been used to play video and board games, including games with immense numbers of possible moves such as Go. In robotics, neural networks have been used for motion planning of a robot, visual navigation, control stabilization, and driving strategies for autonomous vehicles.

Figure 2:
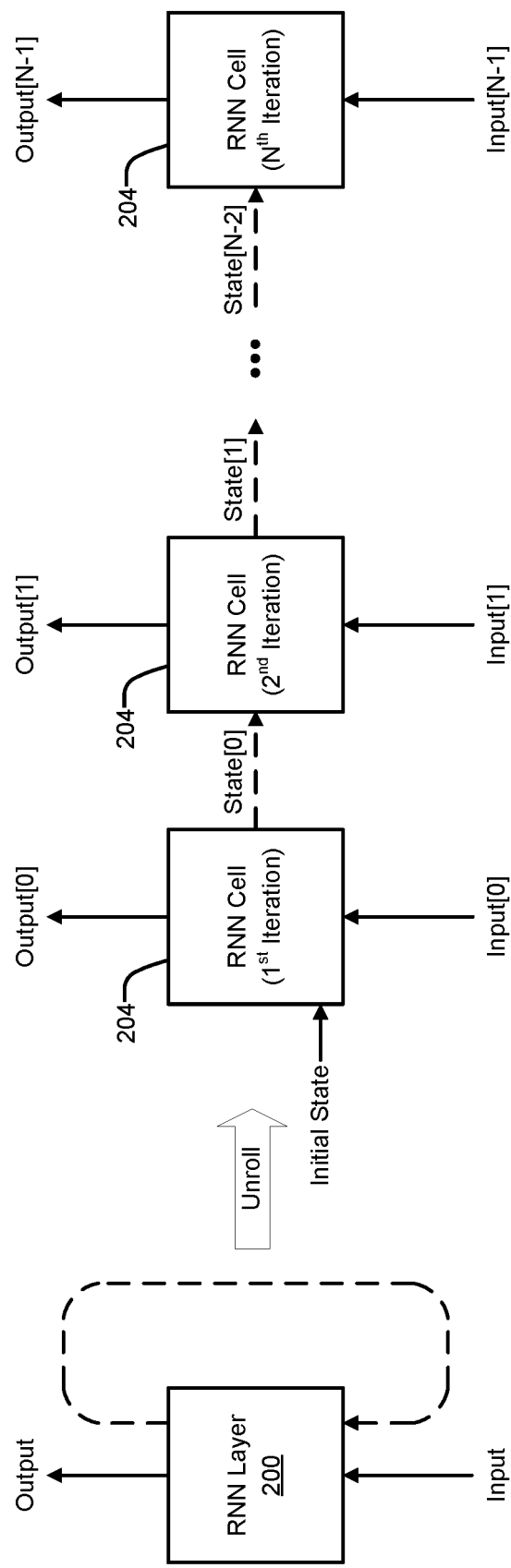
FIG. 2 illustrates an example of a unidirectional recurrent neural network (RNN) layer.

FIG. 2 illustrates an example of a unidirectional RNN layer 200. The RNN layer 200 may correspond to one or more operations that may be performed on an input over multiple iterations at multiple time steps. For example, the RNN layer 200 may be unrolled into multiple RNN cells 204 that each correspond to the same one or more operations. The input to the RNN layer 200 may include N time-sequenced values from Input [0] to Input [N-1] and the output may also include N time-sequenced values from Output [0] to Output [N-1].

Each of the RNN cells 204 may receive an input value along with an input state. For the first iteration, a RNN cell 204 receives the input value Input [0] and an initial state and produces the output value Output [0] and the state State [0] based on Input [0] and the initial state. Similarly, for the second iteration, a RNN cell 204 receives the input value Input [1] and the state State [0] and produces the output value Output [1] and the state State [1] based on Input [1] and State [0]. Similarly, for the $N^{th}$ iteration, a RNN cell 204 receives the input value Input [N-1] and the state State [N-2] and produces the output value Output [N-1] based on Input [N-1] and State [N-2].

Figure 3:
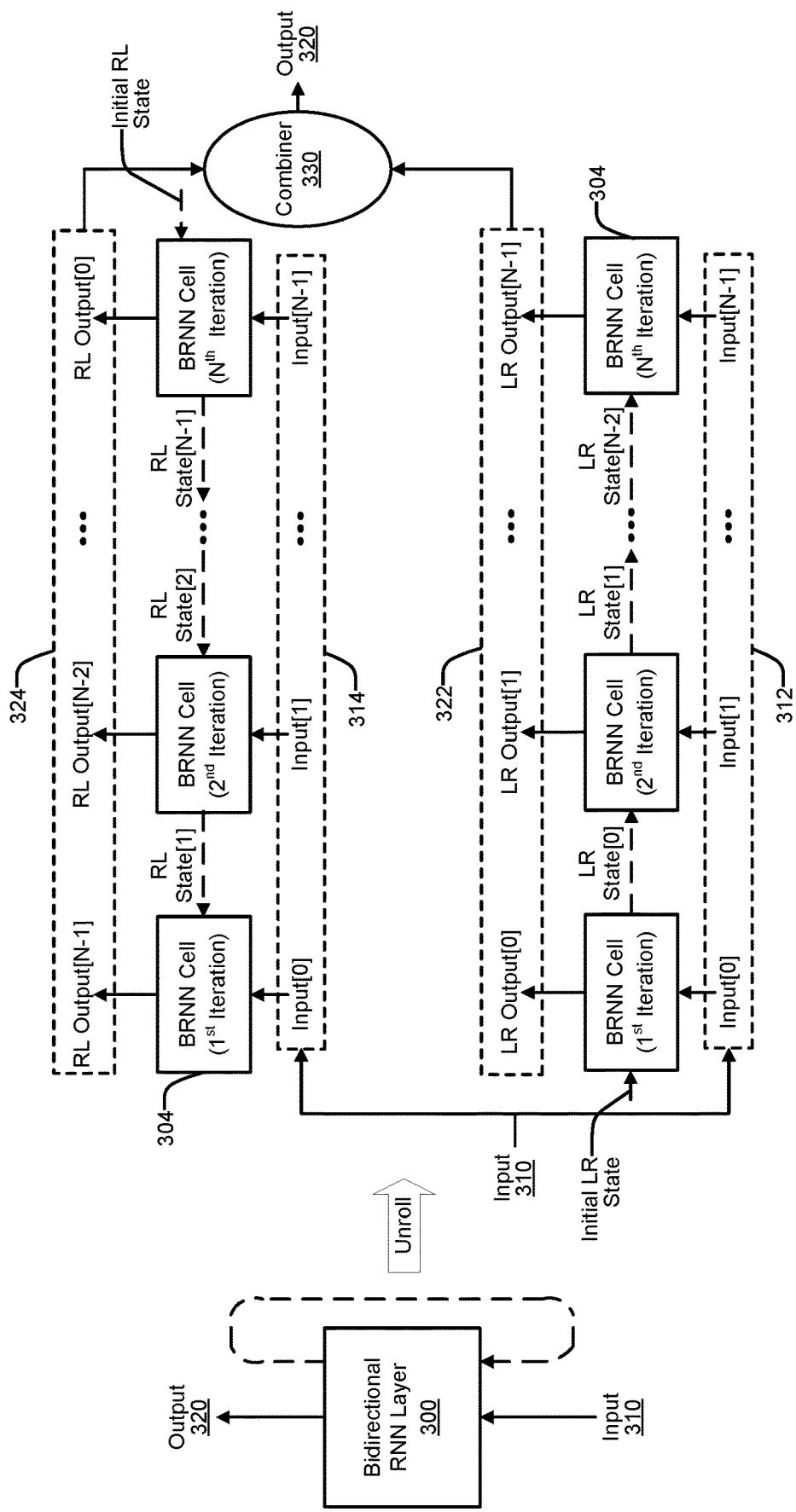
FIG. 3 illustrates an example of a bidirectional RNN layer.

FIG. 3 illustrates an example of a bidirectional RNN layer 300. The bidirectional RNN layer 300 may correspond to one or more operations that may be performed on an input over multiple iterations at multiple time steps. The bidirectional RNN layer 300 may be unrolled into multiple RNN cells 304 that each correspond to the same one or more operations. The bidirectional RNN layer 300 is an enhancement to the unidirectional RNN layer 200 and essentially consists of two unidirectional RNN layers, one operating from left to right, and the other operating from right to left. Each of the layers receives an overall input 310, and the outputs of the two layers are merged to produce an overall output 320. The overall input 310 may include N time-sequenced values from Input [0] to Input [N-1] and the overall output 320 may also include N time-sequenced values from Output [0] to Output [N-1].

In some embodiments, an input 312 provided to the left-to-right layer is equal to the overall input 310, and an input 314 provided to the right-to-left layer is also equal to the overall input 310. For the first iteration, a bidirectional RNN cell 304 of the left-to-right layer receives the input value Input [0] and an initial state and produces the output value LR Output [0] and the state LR State [0] based on Input [0] and the initial state. Also for the first iteration, a bidirectional RNN cell 304 of the right-to-left layer receives the input value Input [0] and the state RL State [1] and produces the output value RL Output [N-1] and the state RL State [0] based on Input [0] and RL State [1].

For the second iteration, a bidirectional RNN cell 304 of the left-to-right layer receives the input value Input [1] and the state LR State [0] and produces the output value LR Output [1] and the state LR State [1] based on Input [1] and LR State [0]. Also for the second iteration, a bidirectional RNN cell 304 of the right-to-left layer receives the input value Input [1] and the state RL State [2] and produces the output value RL Output [N-2] and the state RL State [1] based on Input [1] and RL State [2].

For the $N^{th}$ iteration, a bidirectional RNN cell 304 of the left-to-right layer receives the input value Input [N-1] and the state LR State [N-2] and produces the output value LR Output [N-1] and the state LR State [N-1] based on Input [N-1] and LR State [N-2]. Also for the $N^{th}$ iteration, a bidirectional RNN cell 304 of the right-to-left layer receives the input value Input [N-1] and an initial state and produces the output value RL Output [0] and the state RL State [N-1] based on Input [N-1] and the initial state.

In some embodiments, an output 322 of the left-to-right layer includes the N time-sequenced values from LR Output [0] to LR Output [N-1] and an output 324 of the right-to-left layer includes the N time-sequenced values from RL Output [N-1] to LR Output [0]. The outputs 322 and 324 are fed into a combiner 330 which combines them by, for example, concatenating LR Output [0] with RL Output [N-1], LR Output [1] with RL Output [N-2], LR Output [N-1] with RL Output [0], and the like. The combination of outputs 322 and 324 forms the overall output 320.

FIGS. 4A and 4B illustrate tables that show the input states, input values, output states and output values for the bidirectional RNN layer 300. Specifically, FIG. 4A illustrates a table 400A corresponding to the left-to-right layer and FIG. 4B illustrates a table 400B corresponding to the right-to-left layer. With respect to the notation used in FIGS. 4A and 4B, "Iteration=0" corresponds to the first iteration, "Iteration=1" corresponds to the second iteration, and "Iteration=N-1" corresponds to the $N^{th}$ iteration.

When the bidirectional RNN layer 300 is statically compiled for a processor that does not support dynamic control flow, it may be compiled for a fixed length since the compiler does not have knowledge of N, which is determined at runtime. The fixed length is referred to as the maximum length, which is also referred to herein as the value "L". When the maximum length L is equal to N, the bidirectional RNN layer 300 functions properly. However, when the maximum length L is greater than N, padding the input 310 (and similarly the inputs 312 and 314) causes an erroneous output, as demonstrated in reference to FIGS. 5A and 5B.

FIGS. 5A and 5B illustrate tables that show the input states, input values, output states and output values for the bidirectional RNN layer 300. FIG. 5A illustrates a table 500A showing the correct and expected behavior when the maximum length L is greater than N. In the illustrated embodiment, L=3 and N=2, and when the inference is performed for N=2 at runtime, the input for Iteration=2 is zero padded. The shaded portions of the table 500A indicate that the values/states are irrelevant.

FIG. 5B illustrates a table 500B showing the actual and erroneous behavior that occurs for the same scenario described in FIG. 5A (L=3 and N=2). When the bidirectional RNN layer 300 is compiled for a static value of 3 iterations, it will execute all 3 time steps as shown in FIG. 5B. As indicated by arrow 502, RL State [2] is passed to evaluate Iteration=1 instead of the initial RL state. This causes an erroneous value for RL Output [1].

Figure 6:
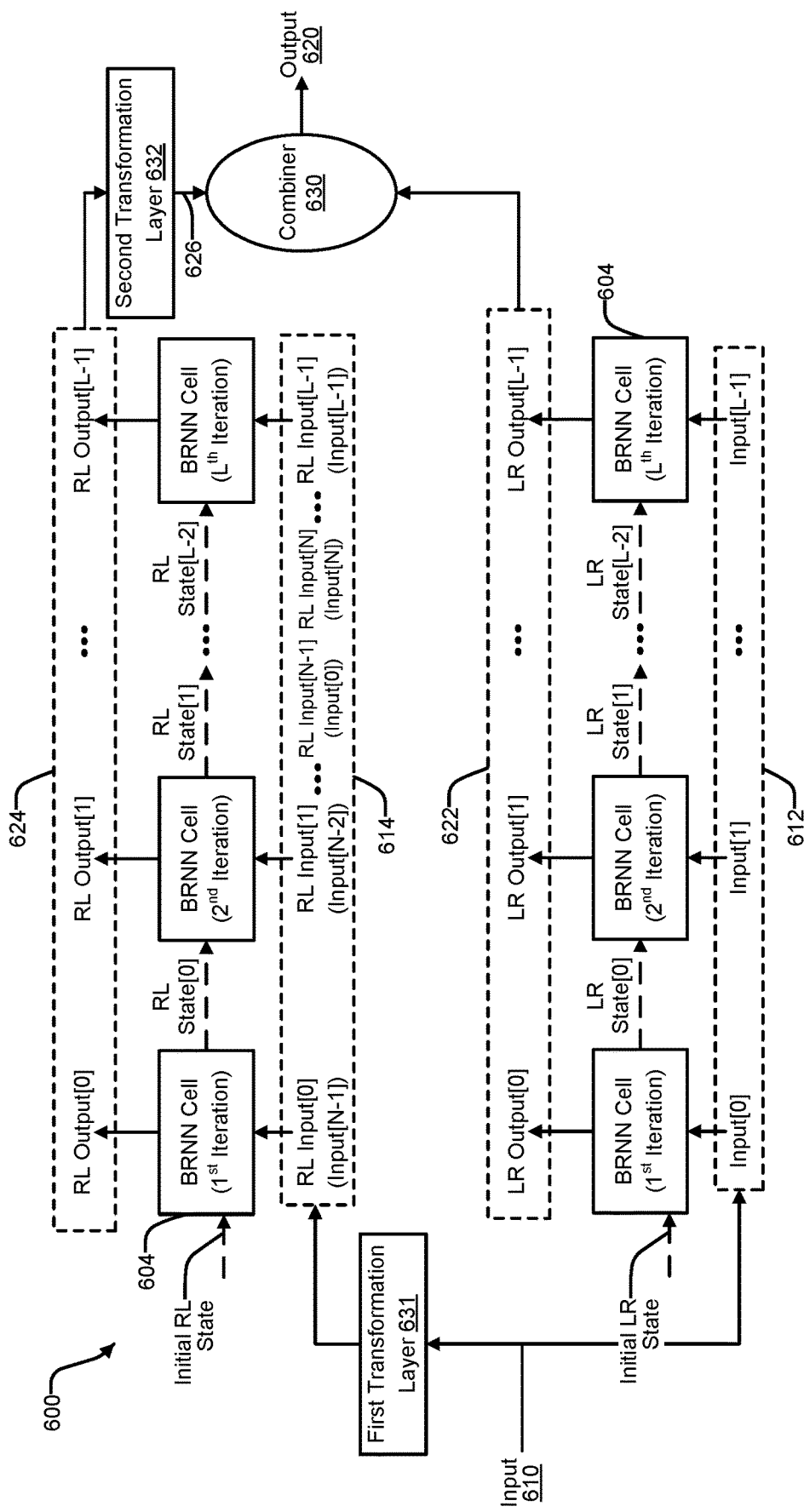
FIG. 6 illustrates an example of a bidirectional RNN layer.

FIG. 6 illustrates an example of a bidirectional RNN layer 600 having additional transformation layers for modifying the input and output data of the right-to-left layer. The bidirectional RNN layer 600 may correspond to one or more operations that may be performed on an input over multiple iterations at multiple time steps. The bidirectional RNN layer 600 may be unrolled into multiple RNN cells 604 that each correspond to the same one or more operations. The bidirectional RNN layer 600 consists of two unidirectional RNN layers, one operating from left to right (alternatively referred to as the forward network or the forward RNN), and the other operating from right to left (alternatively referred to as the reverse network or the reverse RNN).

An overall input 610 is received by the bidirectional RNN layer 600 and is used for an input 612 of the left-to-right layer. For the right-to-left layer, the bidirectional RNN layer 600 may include a first transformation layer 631 that performs a first transformation on the overall input 610 to produce a transformed input 614, which is fed into the right-to-left layer. The first transformation layer 631 may reverse the order of the first N values of the overall input 610 and optionally set (e.g., overwrites or appends) the last L-N values to zero. The input 612 may include L time-sequenced values from Input [0] to Input [L-1] and the transformed input 614 may include L time-sequenced values from RL Input [0] to RL Input [L-1].

The left-to-right layer produces an output 622 based on the input 612 and the right-to-left layer produces an output 624 based on the transformed input 614. The output 622 may include L time-sequenced values from LR Output [0] to LR Output [L-1] and the output 624 may include L time-sequenced values from RL Output [0] to RL Output [L-1]. The bidirectional RNN layer 600 may include a second transformation layer 632 that performs a second transformation on the output 624 to produce a transformed output 626, which is fed into a combiner 630. The second transformation layer 632 may reverse the order of the first N values of the output 624 and optionally delete or overwrite the last L-N values with zeros.

For the first iteration, a bidirectional RNN cell 604 of the left-to-right layer receives the input value Input [0] and an initial state and produces the output value LR Output [0] and the state LR State [0] based on Input [0] and the initial state. Also for the first iteration, a bidirectional RNN cell 604 of the right-to-left layer receives the input value RL Input [0] and an initial state and produces the output value RL Output [0] and the state RL State [0] based on RL Input [0] and the initial state.

For the second iteration, a bidirectional RNN cell 604 of the left-to-right layer receives the input value Input [1] and the state LR State [0] and produces the output value LR Output [1] and the state LR State [1] based on Input [1] and LR State [0]. Also for the second iteration, a bidirectional RNN cell 604 of the right-to-left layer receives the input value RL Input [1] and the state RL State [0] and produces the output value RL Output [1] and the state RL State [1] based on RL Input [1] and RL State [0].

For the Lth iteration, a bidirectional RNN cell 304 of the left-to-right layer receives the input value Input [L-1] and the state LR State [L-2] and produces the output value LR Output [L-1] and the state LR State [L-1] based on Input [L-1] and LR State [L-2]. Also for the Lth iteration, a bidirectional RNN cell 604 of the right-to-left layer receives the input value RL Input [L-1] and an the state RL State [L-2] and produces the output value RL Output [L-1] and the state RL State [L-1] based on RL Input [L-1] and RL State [L-2].

In some embodiments, the right-to-left layer is transformed, resulting in a transformed right-to-left layer. As shown in the illustrated embodiment, the transformed right-to-left layer may process input values from left to right and may pass states from left to right, similar to that performed by the left to right layer.

The outputs 622 and 626 are fed into the combiner 630 which combines them by, for example, concatenating aligned values of the outputs, similar to that described in reference to FIG. 3. The combination of outputs 622 and 624 forms the overall output 620.

FIGS. 7A and 7B illustrate tables that show the input states, input values, output states and output values for the bidirectional RNN layer 600. FIG. 7A illustrates a table 700A showing the correct and expected behavior when N=L.

FIG. 7B illustrates a table 700B showing the erroneous behavior ("Merged Output") and the corrected behavior ("Corrected Merged Output") when N<L and the first transformation layer 631 and the second transformation layer 632 are either not used (for the "Merged Output") or used (for the "Corrected Merged Output"). The shaded portions of the table 700B indicate that the values are irrelevant. As can be observed, by using the transformation layers, RL Output [0] is moved from the end of the output values such that it becomes aligned with LR Output [1], and RL Output [1] is moved to the beginning to become aligned with LR Output [0].

FIG. 8 illustrates a table 800 that shows the input states, input values, output states and output values for the right-to-left layer of the bidirectional RNN layer 600 when L=3 and N=2. In contrast to FIG. 5B, the initial RL state and RL Input [0] are processed during the same iteration, resulting in a correct value for RL Output [0]. Additionally, RL State [0] and RL Input [1] are processed during the same iteration, resulting in a correct value for RL Output [1] due to RL State [0] being the correct state and further due to RL State [0] and RL Input [1] being processed during the same iteration. The shaded portions of the table 800 indicate that the values/states are irrelevant.

Figure 9:
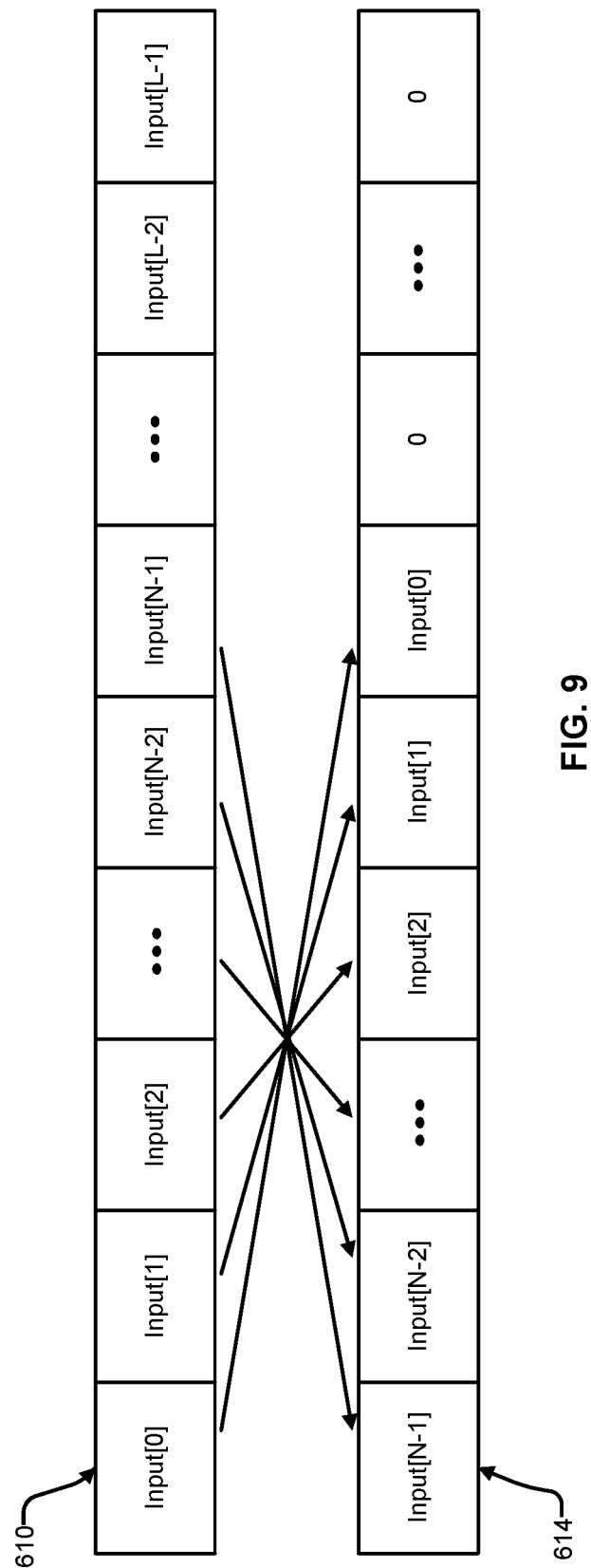
FIG. 9 illustrates an example of a possible first transformation performed by a first transformation layer.

FIG. 9 illustrates an example of a possible first transformation performed by the first transformation layer 631 on the overall input 610 to produce the transformed input 614. In the illustrated example, the order of the first N values of the overall input 610 is reversed such that Input [0] is switched with Input [N-1], Input [1] is switched with Input [N-2], and the like. The last L-N values of the overall input 610 may also be overwritten with zeros during the first transformation.

Figure 10:
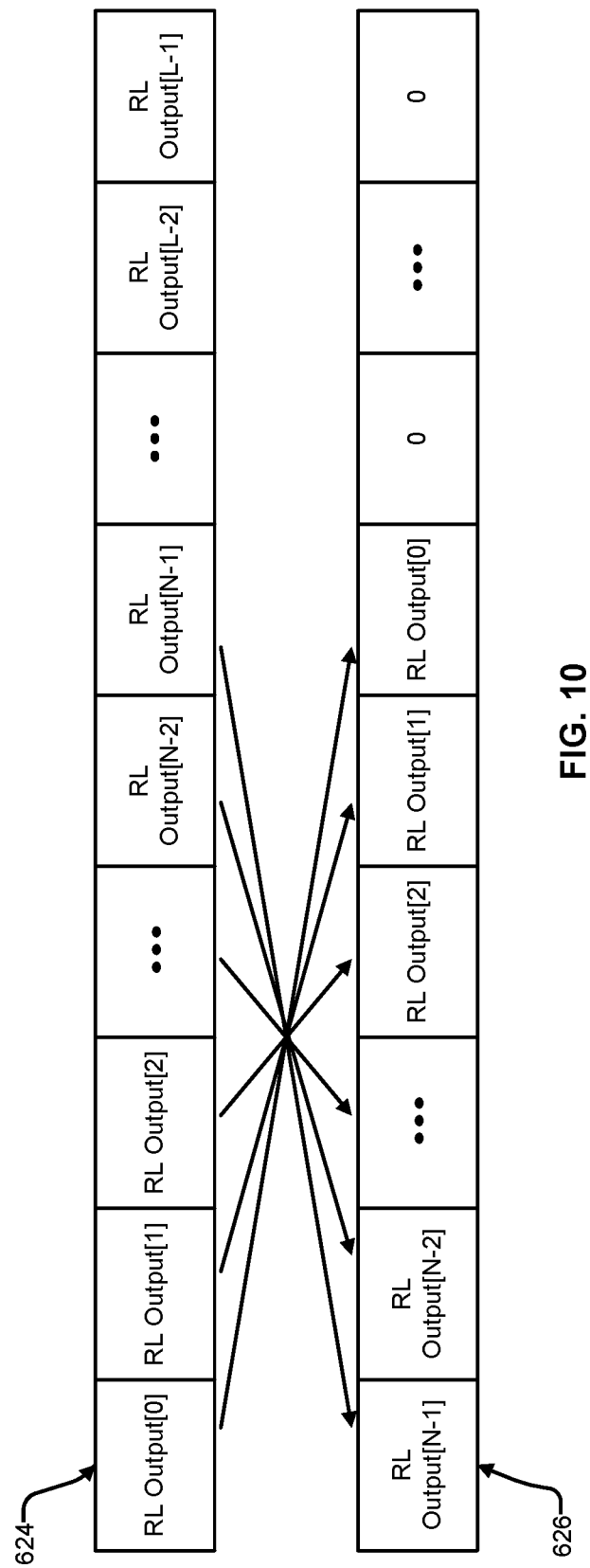
FIG. 10 illustrates an example of a possible second transformation performed by a second transformation layer.

FIG. 10 illustrates an example of a possible second transformation performed by the second transformation layer 632 on the output 624 to produce the transformed output 616. In the illustrated example, the order of the first N values of the output 624 is reversed such that RL Output [0] is switched with RL Output [N-1], RL Output [1] is switched with RL Output [N-2], and the like. The last L-N values of the output 624 may also be overwritten with zeros during the second transformation. In some embodiments, the last L-N values of the output 624 may also be overwritten with zeros during the second transformation.

Figure 11:
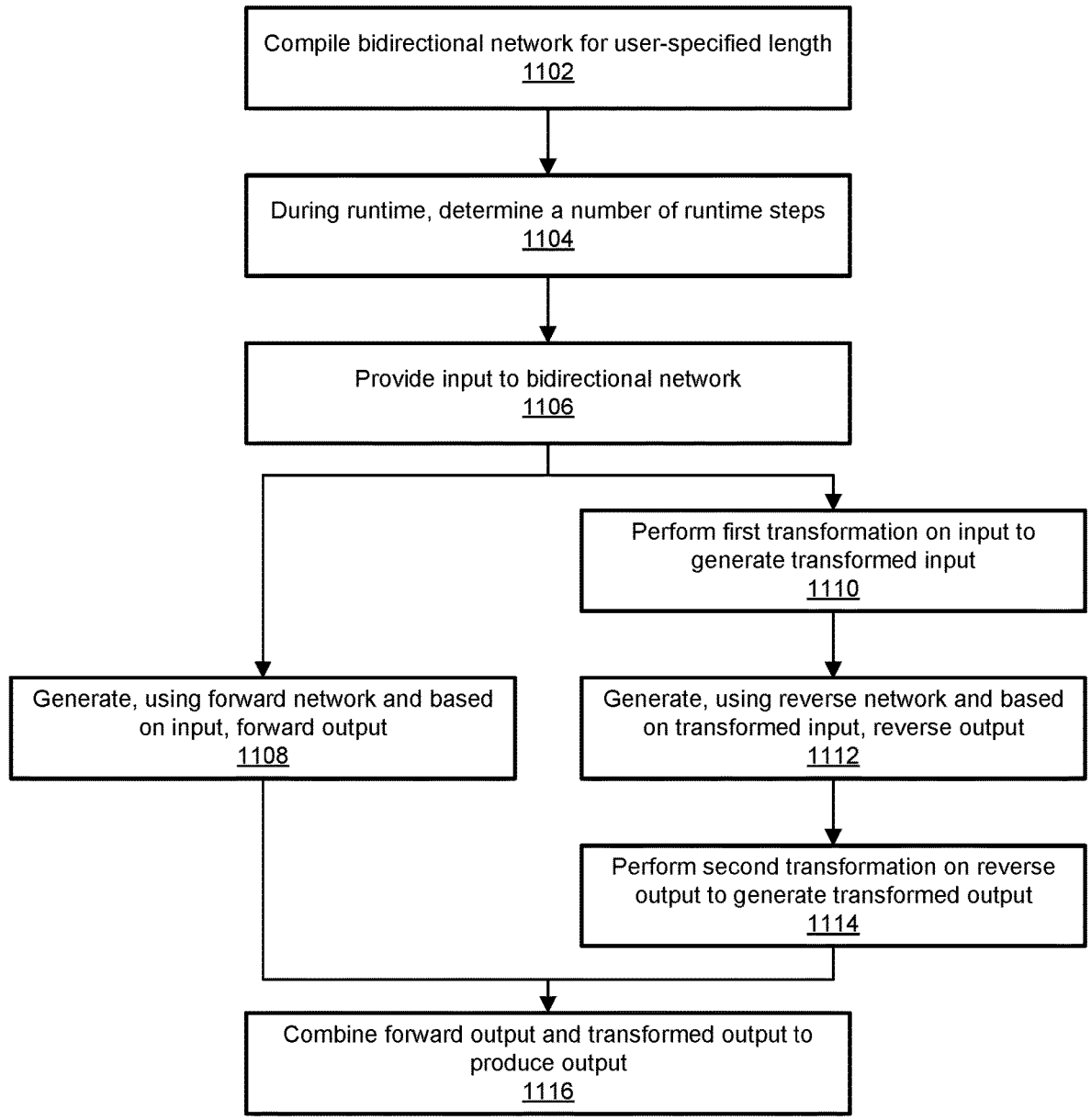
FIG. 11 includes a flowchart illustrating an example of a method for executing a bidirectional network on a data-flow centric processor.

FIG. 11 includes a flowchart illustrating an example of a method 1100 for executing a bidirectional network on a data-flow centric processor. In some embodiments, the method 1100 may be considered a method for aligning tensors for execution of a bidirectional RNN on a data-flow centric processor. One or more steps of the method 1100 may be performed in a different order than the illustrated example, and one or more steps of the method 1100 may be omitted during the performance of the method 1100. One or more steps of the method 1100 may be performed by a compiler running on a host processor, or by a data-flow centric processor such as a data-flow centric accelerator, or a runtime program running on the host processor.

At step 1102, the bidirectional network is compiled for a user-specified length (e.g., L). In some embodiments, the bidirectional network is a bidirectional RNN. In some embodiments, the bidirectional network includes a bidirectional network layer or a bidirectional RNN layer. In some embodiments, the bidirectional network includes a forward network and a reverse network, where the forward network is operable to perform a set of operations on a time-sequenced input in a forward direction and the reverse network is operable to perform a set of operations on a time-sequenced input in a reverse direction.

At step 1104, a number of runtime steps (e.g., N) is determined. In some embodiments, the number of runtime steps is determined based on an input to the bidirectional network. For example, the number of runtime steps may be determined based on the number of time steps of the input or the length of the input. For example, if the number of time-sequenced values of the input is equal to N, then the number of runtime steps may also be set equal to N. In some embodiments, the number of runtime steps is determined while performing an inference.

At step 1106, an input is provided to the bidirectional network. In some embodiments, the input includes N time-sequenced values. In some embodiments, the input is zero padded to increase its length from N to L. In some embodiments, the input is an input tensor.

At step 1108, a forward output is generated using the forward network based on the input. The forward output may be generated when the input is provided to the forward network.

At step 1110, a first transformation is performed on the input to generate a transformed input. The first transformation may be performed by a first transformation layer of the bidirectional network. In some embodiments, performing the first transformation includes modifying an order of a set of values of the input. In some embodiments, the set of values of the input may be the first N values of the input. Modifying the order of the set of values of the input may include reversing (e.g., transposing) the order of the set of values of the input. In some embodiments, performing the first transformation includes overwriting a last set of values of the input with zeros. In some embodiments, the last set of values of the input may be the last L-N set of values. In some embodiments, the last set of values of the input may be all the values of the input after the set of values of the input.

In some embodiments, reversing the order of the set of values may be implemented by the compiler, allowing the transformation to be addressed as a memory lookup instead of copying across memories and variables. In some embodiments, the compiler may identify the bidirectional network and, in response, may add the first transformation layer to the bidirectional network.

At step 1112, a reverse output is generated using the reverse network based on the transformed input. The reverse output may be generated when the transformed input is provided to the reverse network. In some embodiments, the reverse network is a transformed reverse network.

At step 1114, a second transformation is performed on the reverse output to generate a transformed output. The second transformation may be performed by a second transformation layer of the bidirectional network. In some embodiments, performing the second transformation includes modifying an order of a set of values of the reverse output. In some embodiments, the set of values of the reverse output may be the first N values of the reverse output. Modifying the order of the set of values of the reverse output may include reversing (e.g., transposing) the order of the set of values of the reverse output. In some embodiments, performing the second transformation includes overwriting a last set of values of the reverse output with zeros. In some embodiments, performing the second transformation includes deleting the last set of values of the reverse output. In some embodiments, the last set of values of the reverse output may be the last L-N set of values. In some embodiments, the last set of values of the reverse output may be all the values of the reverse output after the set of values of the reverse output.

In some embodiments, reversing the order of the set of values may be implemented by the compiler, allowing the transformation to be addressed as a memory lookup instead of copying across memories and variables. In some embodiments, the compiler may identify the bidirectional network and, in response, may add the first transformation layer to the bidirectional network.

At step 1116, the forward output and the transformed output are combined to produce an output or an overall output. The forward output and the transformed output may be combined by, for example, concatenating corresponding values such as a first value of the forward output with a first value of the transformed output, a second value of the forward output with a second value of the transformed output, and the like.

Figure 12:
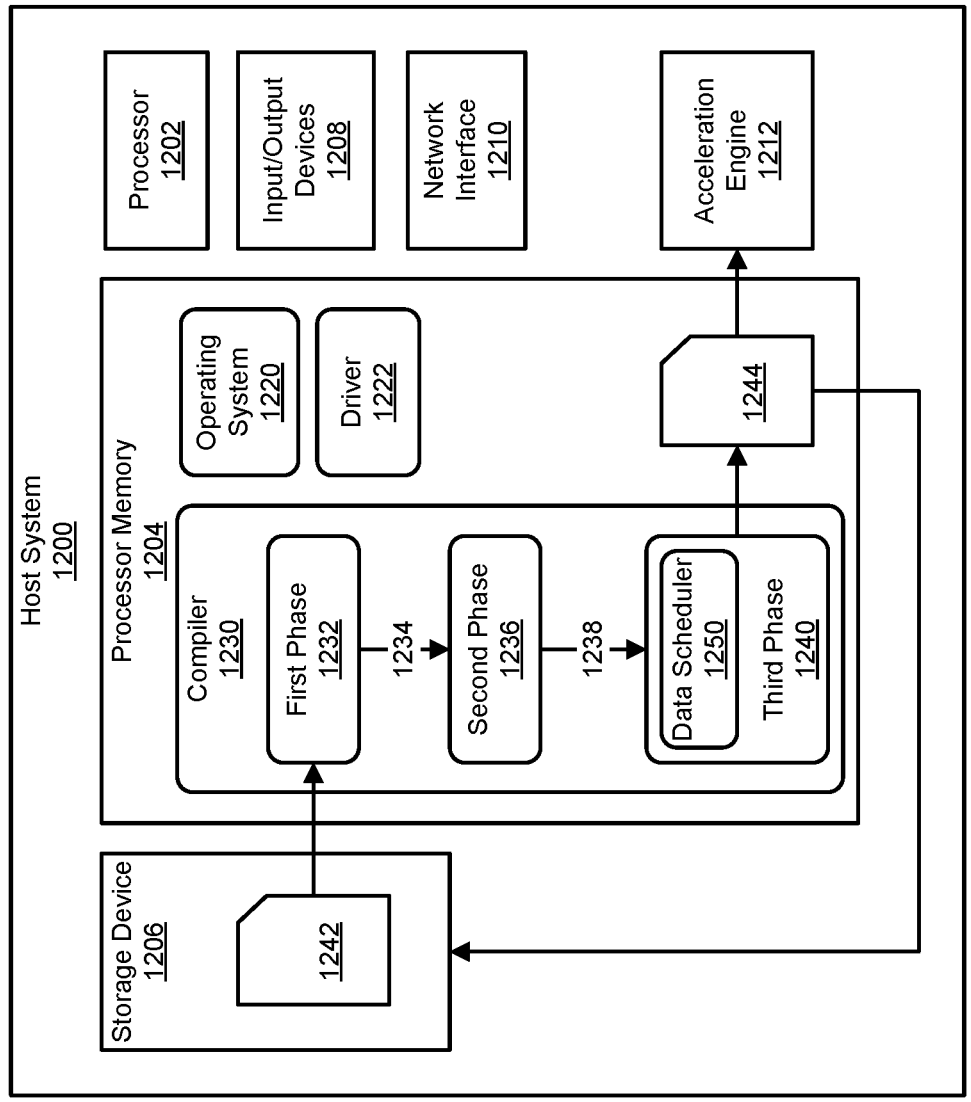
FIG. 12 includes a block diagram illustrating an example of a host system 1200 on which a compiler, a data-flow centric processor, and a host processor, such as are described herein, can run.

FIG. 12 includes a block diagram illustrating an example of a host system 1200 on which a compiler, a data-flow centric processor, and a host processor, such as are described herein, can run. The illustrated host system 1200 is an example of a computing device, and includes a processor 1202, a processor memory 1204, at least one storage device 1206, various Input/Output (I/O) devices 1208, and at least one network interface 1210. In the example of FIG. 12, the host system 1200 also includes an acceleration engine 1212, which is an integrated circuit device that can accelerate certain operations or computations performed by the host system 1200. In various examples, the host system 1200 can be implemented as a server in a data center, a desktop computer, a laptop computer, a tablet computer, or a smartphone, among other examples. In some examples, operations or components discussed below as performed or included in the host system 1200 can be performed or included in other computer devices. For example, the compiler 1230 can execute on the host system 1200 while the acceleration engine 1212 is located at a different host system.

The processor 1202 is an integrated circuit device that can execute program code, in the form of instructions. The program code can be used for various software applications or tools, such as an operating system 1220, the debugger 1246, or the illustrated compiler 1230. While the processor 1202 is executing a program, the instructions for the program can be stored in the processor memory 1204. The instructions can also be stored elsewhere, such as on the storage device 1206, and can be loaded into the processor memory 1204 when needed by the processor 1202. The processor 1202 can also use the processor memory 1204 for temporary storage of other data on which the processor 1202 is operating. In various examples, the processor memory 1204 is a volatile memory type, such as a type of Random Access Memory, though non-volatile memory types can, alternatively or additionally, be used for the processor memory 1204.

The storage device 1206 is an example of a device that can include non-volatile memory. For example, the storage device 1206 can be a magnetic disk drive, a solid state drive, or an optical drive, among other examples. The storage device 1206 can further be non-transitory, such that program code and other data stored on the storage device 1206 remains present when the storage device 1206 is not powered on.

The storage device 1206 is one example of a peripheral device, which are components that can be coupled to the host system 1200 to add functionality to the host system 1200. Other examples of peripheral devices include the Input/Output devices 1208 and the network interface 1210. The Input/Output devices 1208 can include user input and output devices, such as keyboards, mice, touch screens, microphones, display screens, speakers, printers, and scanners, among other examples. The network interface 1210, which can be implemented using a network interface card, can provide access to one or more networks. The network interface 1210 can include, for example, a physical port for connecting a network cable and/or wireless antennas for communicating with Wi-Fi and/or cellular networks. The network interface 1210 can also be described as an I/O device.

The acceleration engine 1212 is also another type of peripheral device or I/O device. The acceleration engine 1212 is a device that is purpose built to perform certain operations that can be performed by the processor 1202, but can be performed faster by the acceleration engine 1212. For example, the acceleration engine 1212 can be a neural network accelerator, and, as such, may be able to perform the large scale, parallel computations of a neural network more efficiently than when the computations are performed by the processor 1202. As another example, the acceleration engine 1212 can be a GPU, and may be optimized to perform the computations needed for graphics rendering. Other examples of devices that can be implemented by the acceleration engine 1212 include cryptographic accelerators, compression and decompression accelerators, 3-D accelerators, regular expression accelerators, security accelerators, and others.

In various examples, the acceleration engine 1212 can execute program code to perform certain operations. For example, when the acceleration engine 1212 is a neural network accelerator, the acceleration engine 1212 can be programmed to execute a particular neural network, such as one that performs image recognition or one that performs machine translation. As a further example, to support the execution of a neural network, the acceleration engine 1212 can be programmed to perform operations such as copying data for the neural network from processor memory 1204 (for example) into the acceleration engine 1212, copying input data for the neural network from processor memory 1204 into the acceleration engine 1212, and/or copying results from the acceleration engine 1212 into the processor memory 1204, among other examples.

To generate program code for the acceleration engine 1212, in various examples, the host system 1200 can execute the compiler 1230. Compilers, in general, are software programs that translate program code written in a human-readable language into a format (e.g., machine instructions) that can be read and processed by an integrated circuit device. In the example of FIG. 12, the acceleration engine 1212 is a neural network accelerator and the compiler 1230 is for compiling a neural network description into instructions to be executed on the acceleration engine 1212. When the acceleration engine 1212 implements a different type of accelerator, another compiler can be used.

The compiler 1230 can be activated, for example, when the operating system 1220 receives keyboard, mouse, touchscreen, voice commands, or other inputs from the Input/Output devices 1208. The inputs can further include parameters for the compiler 1230, such as the input code 1242 to compile and configuration options for the compilation process. Once the compiler 1230 is activated, the processor 1202 can load the instructions for the compiler 1230 into the processor memory 1204, and can execute the instructions.

In the example of FIG. 12, the compiler 1230 includes a first stage 1232, a second stage 1236, and a third stage 1240, which each perform different operations to produce compiled code 1244. In other examples, the compiler 1230 can combine the operations of the first stage 1232, second stage 1236, and/or third stage 1240 into fewer stages, or can divide the operations of one of the stages into multiple stages.

The first stage 1232 can receive and process input code 1242. The input code 1242 can describe a program in a high-level programming language, such as Java, C++, or Tensorflow, among many other examples. The input code 1242 can describe, for example, steps to perform image recognition, speech recognition, machine translation, or other operations. The input code 1242 can be obtained, for example, from the storage device 1206. Alternatively, though not illustrated here, the input code 1242 may be located in the processor memory 1204 or can be obtained from a network location, using the network interface 1210. Processing of the input code 1242 can include sorting the operations described in the input code 1242 into layers, where the outputs of one layer provide the inputs to a next layer. Processing can also include identifying steps to be performed by the processor 1202, rather than by the acceleration engine 1212. For example, the processor 1202, through the execution of a driver 1222, may need to perform steps such as configuring Direct Memory Access (DMA) descriptors for moving data into or out of the acceleration engine 1212, among other examples.

The output 1234 of the first stage 1232 can be organized, for example, in the layers, nodes, and connections between nodes of a neural network. The second stage 1236 can perform intermediate processing on this output 1234. For example, the operations performed in any one layer, or at any one node in a layer, may be too many for the acceleration engine 1212 to perform at the same time. The acceleration engine 1212 may, for example, have a limited amount of local storage space for the data needed for a computation, or the computations may be more than the acceleration engine 1212 can perform at one time. In this example, the first stage 1232 can break the operations of the layer or node down into smaller operations, which can fit into the acceleration engine's local memory and/or can fit into the computing capacity of the acceleration engine 1212. Processing of the output 1234 of the first stage 1232 can include other steps, such as scheduling, or determining the order in which the acceleration engine 1212 and/or processor 1202 will perform operations, among other examples.

In various examples, the output 1238 of the second stage 1236 includes the various steps to be performed by components of the acceleration engine 1212, in the order that the steps are to be performed. The output 1238 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 1240 can operate on the output 1238 of the second stage 1236, and perform various steps before producing the instructions that are to be executed by the acceleration engine 1212. These steps can include, for example, removing redundant dependencies, resolving or handling dependencies between nodes by inserting synchronization instructions into the code, identifying possible optimizations in memory usage or memory bandwidth usage, and other operations.

The output of the third stage 1240 is compiled code 1244, which may include machine instructions in binary format. In some examples, the compiled code 1244 can be stored in the processor memory 1204. Alternatively or additionally, the compiled code 1244 can be copied to the storage device 1206 or to a network location. As noted above, the acceleration engine 1212 may be located at a different host system, in which case the compiled code 1244 can be sent over the network interface 1210 to the other host system.

In the example of FIG. 12, the host system 1200 can execute a driver 1222, which can also be referred to as a device driver or runtime driver, that manages the acceleration engine 1212. The driver 1222 can provide an interface between applications executing on the host system 1200 (or on another host system) and the acceleration engine 1212. For example, the driver 1222 can provide an Application Program Interface (API) that defines functions for feeding input data to the acceleration engine 1212 and defining the operation to perform on the input data. In this and other examples, the driver 1222 can configure the acceleration engine 1212 to perform the operation. For example, the driver 1222 can identify a neural network that the acceleration engine 1212 is to execute, as well as the location in the processor memory 1204 or on the storage device 1206 where the compiled code 1244 for the neural network is located. The driver 1222 can further load into the acceleration engine 1212 or cause the acceleration engine 1212 to load the compiled code 1244, can load or cause the acceleration engine 1212 to load the input data on which the neural network is to operate, and/or can cause the acceleration engine 1212 to begin executing on the input data. Once the acceleration engine 1212 has finished, the acceleration engine 1212 can notify the driver 1222, and the driver 1222 can deliver a result back to the application that requested the result.

Figure 13:
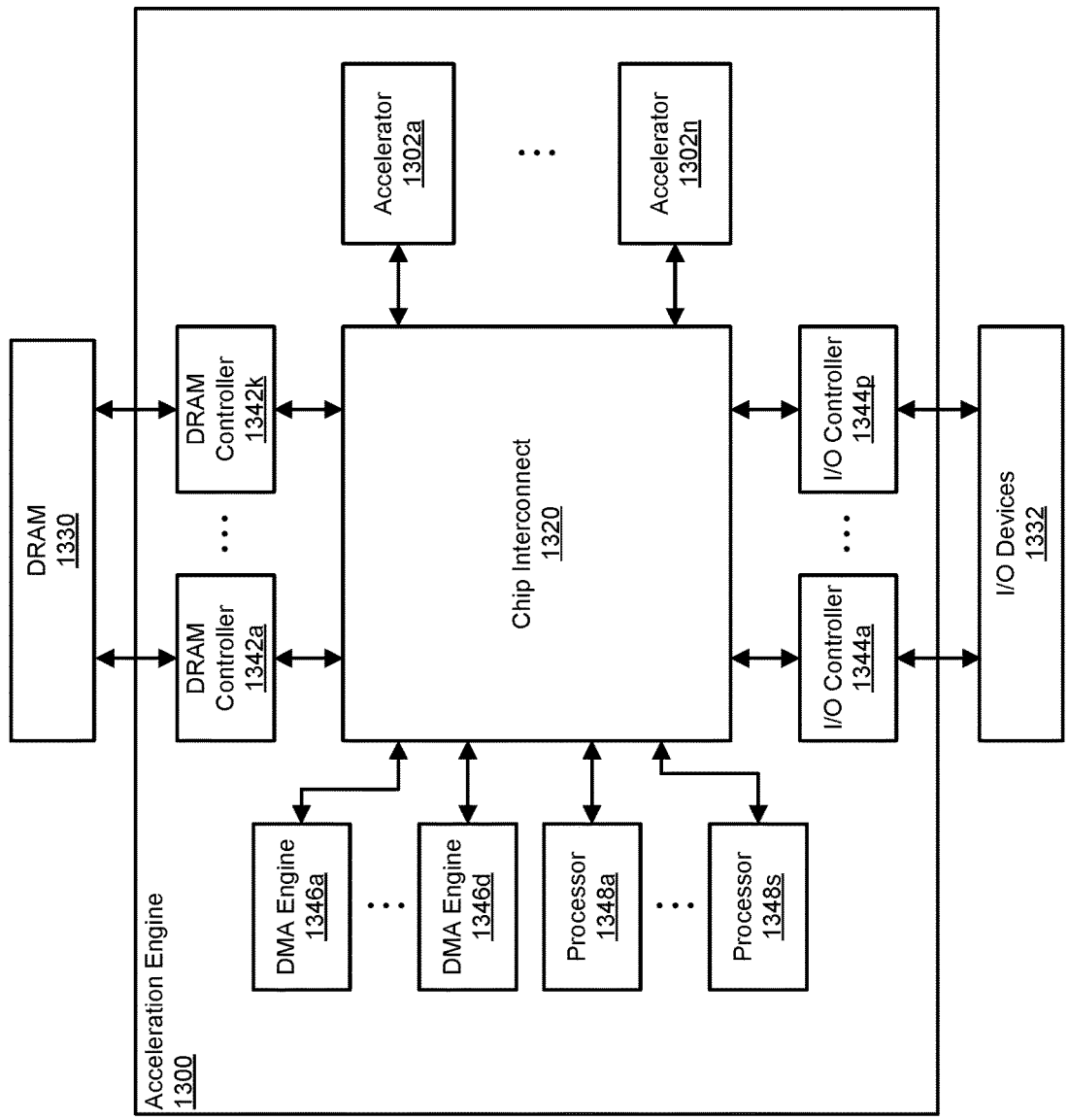
FIG. 13 includes a block diagram that illustrates an example of an acceleration engine.

FIG. 13 includes a block diagram that illustrates an example of an acceleration engine 1300. The acceleration engine 1300 is an example of an integrated circuit that can include one or more accelerators 1302a-1302n that may be similar to the accelerator illustrated in FIG. 14.

In the example of FIG. 13, the acceleration engine 1300 includes multiple accelerators 1302a-1302n, each of which can perform a set of operations. In various examples, the accelerators 1302a-1302n are for particular types of operations, so that the accelerators 1302a-1302n can perform the operations much faster than when similar operations are performed by a general purpose processor. In various examples, to perform a set of operations, input data on which the operations are to be performed must first be moved into the accelerators 1302a-1302n. Additionally, in some cases, program code is also moved into the accelerators 1302a-1302n, which programs the operations that the accelerators 1302a-1302n will perform on the data. In the illustrated example, the acceleration engine 1300 includes n accelerators 1302a-1302n. Examples of accelerators that can be included in the acceleration engine 1300 include graphics accelerators, floating point accelerators, neural network accelerators, and others. In various examples, the accelerators 1302a-1302n can each be the same (e.g., each of the is a graphics accelerator) or can be different (e.g., the accelerators 1302a-1302n include a graphics accelerator, a floating point accelerator, and neural network accelerator).

The example acceleration engine 1300 further includes DRAM controllers 1342a-1342k for communicating with an external memory. The external memory is implemented, in this example, using DRAM 1330. In the illustrated example, the acceleration engine 1300 includes k DRAM controllers 1342a-1342k, each of which may be able to communicate with an independent set of banks of DRAM. In other examples, other types of RAM technology can be used for the external memory. The DRAM controllers 1342a-1342k can also be referred to as memory controllers.

In various examples, input data and/or program code for the accelerators 1302a-1302n can be stored in the DRAM 1330. Different programs can cause the accelerators 1302a-1302n to perform different operations. For example, when one of the accelerators is a neural network accelerator, one program can configure the neural network accelerator to perform speech recognition while another program can configure the neural network accelerator to perform image recognition. In various examples, different accelerators 1302a-1302n can be programmed with different programs, so that each performs a different set of operations. In various examples, the processors 1348a-1348s can manage moving of program code from the DRAM 1330 to the accelerators 1302a-1302n.

The example acceleration engine 1300 further includes I/O controllers 1344a-1344p for communicating with I/O devices 1332 in the system. The acceleration engine 1300 can communicate with I/O devices over, for example, a processor bus. In some examples, the processor bus can be implemented using Peripheral Component Interconnect (PCI) and/or a variation of the PCI bus protocol. The processor bus can connect the acceleration engine 1300 to I/O devices such as, for example, input and output devices, memory controllers, storage devices, and/or network interface cards, among other things. In some examples, the I/O controllers 1344-1344p can enable the acceleration engine 1300 to act as an I/O device for a host processor. For example, the acceleration engine 1300 can be the recipient of input data from the host processor, and a command indicating an operation to be performed on the input data (e.g., a particular computation or analysis). In the illustrated example, the acceleration engine 1300 includes p I/O controllers 1344a-1344p, each of which may include a separate root complex and may communicate with a separate set of I/O devices 1332. In other examples, other standardized bus protocols, such as Ultra Path Interconnect (UPI) can be used for the host bus. In other examples, a proprietary bus protocol can be used.

Movement of data in the acceleration engine 1300 can be managed by one or more processors 1348a-1348s, which can also be referred to as data management processors. In the example of FIG. 13, the acceleration engine 1300 includes s processors 1348a-1348s incorporated into the device (e.g., on the same silicon die). In other examples, the processors 1348a-1348s can be external to the acceleration engine 1300 (e.g., on a different die and/or in a different package). In some examples, the processors 1348a-1348s can manage the movement of data from I/O devices 1332 to the accelerators 1302a-1302n or the DRAM 1330. For example, input data may be located at an I/O device 1332 or in processor memory, and the processors 1348a-1348s can move the input from the I/O device 1332 or processor memory into an accelerator or into DRAM 1330. As another example, program code for the accelerators 1302a-1302n may be located on an I/O device 1332 or in processor memory.

The example acceleration engine 1300 further includes DMA engines 1346a-1346d that can move data between the accelerators 1302a-1302n, DRAM controllers 1342a-1342k, and I/O controllers 1344a-1344p. In the illustrated example, the acceleration engine 1300 includes d DMA engines 1346a-1346d. In some implementations, the DMA engines 1346a-1346d can be assigned to specific tasks, such as moving data from the DRAM controllers 1342a-1342d to the accelerators 1302a-1302n, or moving data between the I/O controllers 1344a-1344p and the accelerators 1302a-1302n. These tasks can be assigned, for example, by enqueueing descriptors with the DMA engines 1346a-1346d, where a descriptor identifies an address for a block of data and an operation (e.g., a read or a write) to perform. A descriptor, for example, can direct a DMA engine to instruct a DMA controller to read a block of data from DRAM 1330. A descriptor can, as a further example, instruct the DMA engine to write data, read by the DMA controller, to an accelerator. Further descriptors can be used to move data from an accelerator to DRAM 1330.

In various examples, each of the processors 1348a-1348s can be responsible for managing the data movement for a different accelerator. In some examples, a processor may manage the data movement for more than one accelerator. Similarly, in various examples, each of the processors 1348a-1348s can be assigned to one or more DMA engines 1346a-1346d. In these and other examples, associations between processors 1348a-1348s, accelerators 1302a-1302n, and DMA engines 1346a-1346d are determined by program code being executed by each respective processor.

In the example acceleration engine 1300, the various components can communicate over a chip interconnect 1320. The chip interconnect 1320 primarily includes wiring for routing data between the components of the acceleration engine 1300. In some cases, the chip interconnect 1320 can include a minimal amount of logic, such as multiplexors to control the direction of data, flip-flops for handling clock domain crossings, and timing logic.

Figure 14:
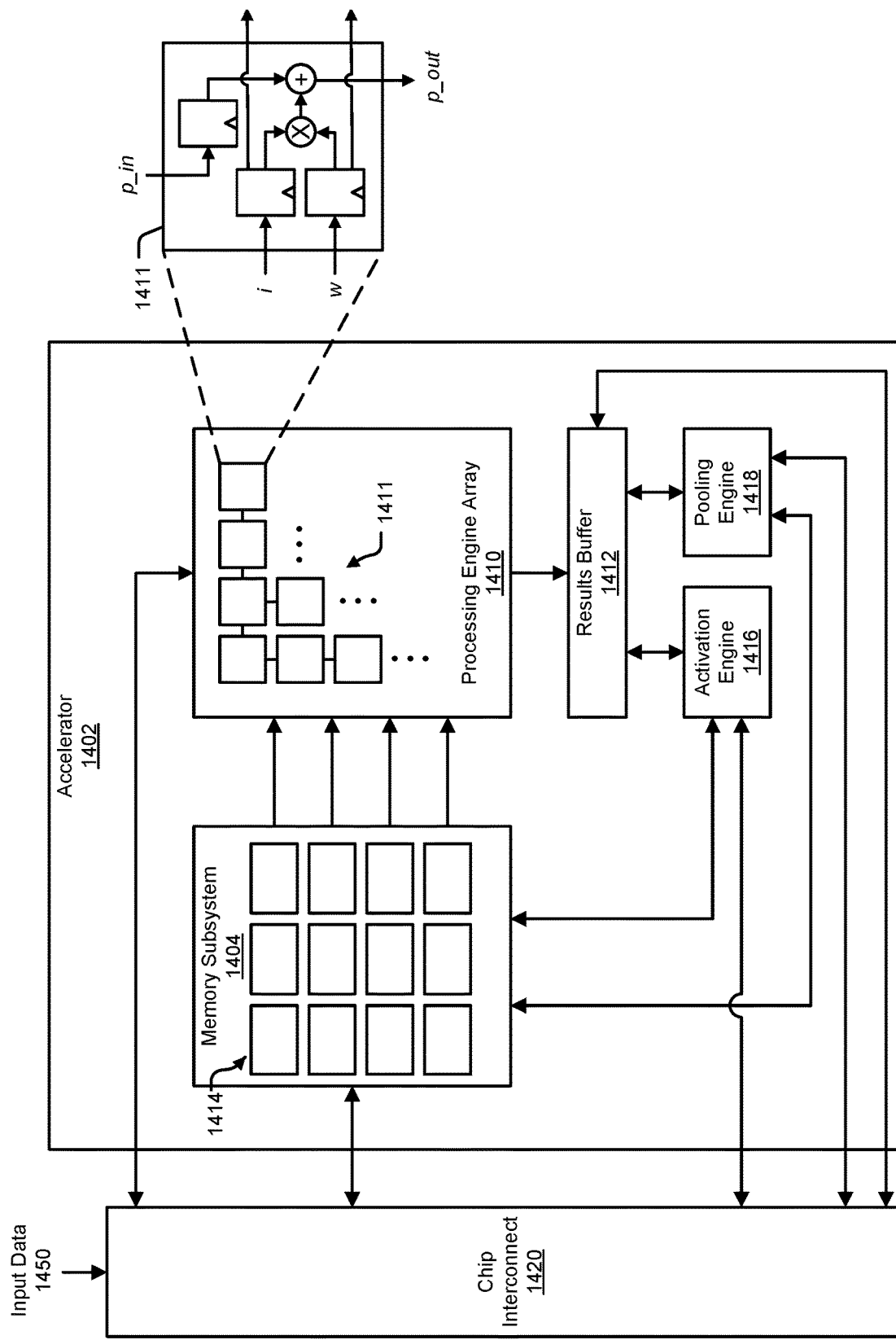
FIG. 14 is a block diagram illustrating an example of an integrated circuit device.

FIG. 14 is a block diagram illustrating an example of an integrated circuit device that can execute a unidirectional or bidirectional RNN layer or network. The example of FIG. 14 illustrates an accelerator 1402. In various examples, the accelerator 1402, for a set of input data (e.g., input data 1450), can execute computations using a processing engine array 1410, an activation engine 1416, and/or a pooling engine 1418. In some examples, the example accelerator 1402 may be an integrated circuit component of a processor, such as a neural network processor. The processor may have other integrated circuit components, including additional accelerator engines.

In various implementations, the memory subsystem 1404 can include multiple memory banks 1414. In these implementations, each memory bank 1414 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1414. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 1404 can permit simultaneous access to the read or write channels of multiple memory banks. As another example, the memory subsystem 1404 can include arbitration logic such that arbitration between, for example, the outputs of multiple memory banks 1414 can result in more than one memory bank's output being used. In these and other examples, though globally managed by the memory subsystem 1404, each memory bank can be operated independently of any other.

Having the memory banks 1414 be independently accessible can increase the efficiency of the accelerator 1402. For example, values can be simultaneously read and provided to each row of the processing engine array 1410, so that the entire processing engine array 1410 can be in use in one clock cycle. As another example, the memory banks 1414 can be read at the same time that results computed by the processing engine array 1410 are written to the memory subsystem 1404. In contrast, a single memory may be able to service only one read or write at a time. With a single memory, multiple clock cycles can be required, for example, to read input data for each row of the processing engine array 1410 before the processing engine array 1410 can be started.

In various implementations, the memory subsystem 1404 can be configured to simultaneously service multiple clients, including the processing engine array 1410, the activation engine 1416, the pooling engine 1418, and any external clients that access the memory subsystem 1404 over a communication fabric 1420. In some implementations, being able to service multiple clients can mean that the memory subsystem 1404 has at least as many memory banks as there are clients. In some cases, each row of the processing engine array 1410 can count as a separate client. In some cases, each column of the processing engine array 1410 can output a result, such that each column can count as a separate write client. In some cases, output from the processing engine array 1410 can be written into the memory banks 1414 that can then subsequently provide input data for the processing engine array 1410. As another example, the activation engine 1416 and the pooling engine 1418 can include multiple execution channels, each of which can be separate memory clients. The memory banks 1414 can be implemented, for example, using static random access memory (SRAM).

In various implementations, the memory subsystem 1404 can include control logic. The control logic can, for example, keep track of the address spaces of each of the memory banks 1414, identify memory banks 1414 to read from or write to, and/or move data between the memory banks 1414. In some implementations, memory banks 1414 can be hardwired to particular clients. For example, a set of memory banks 1414 can be hardwired to provide values to the rows of the processing engine array 1410, with one memory bank servicing each row. As another example, a set of memory banks can be hard wired to receive values from columns of the processing engine array 1410, with one memory bank receiving data for each column.

The processing engine array 1410 is the computation matrix of the example accelerator 1402. The processing engine array 1410 can, for example, execute parallel integration, convolution, correlation, and/or matrix multiplication, among other things. The processing engine array 1410 includes multiple processing engines 1411, arranged in rows and columns, such that results output by one processing engine 1411 can be input directly into another processing engine 1411. Processing engines 1411 that are not on the outside edges of the processing engine array 1410 thus can receive data to operate on from other processing engines 1411, rather than from the memory subsystem 1404.

In various examples, the processing engine array 1410 uses systolic execution, in which data arrives at each processing engine 1411 from different directions at regular intervals. In some examples, input data can flow into the processing engine array 1410 from the left and weight values can be loaded at the top. In some examples weights and input data can flow from the left and partial sums can flow from top to bottom. In these and other examples, a multiply-and-accumulate operation moves through the processing engine array 1410 as a diagonal wave front, with data moving to the right and down across the array. Control signals can be input at the left at the same time as weights, and can flow across and down along with the computation.

In various implementations, the number of columns in the processing engine array 1410 determines the computational capacity of the processing engine array 1410, and the number of rows determines the required memory bandwidth for achieving maximum utilization of the processing engine array 1410. The processing engine array 1410 can have, for example, 64 columns and 428 rows, or some other number of columns and rows.

An example of a processing engine 1411 is illustrated in FIG. 14 in an inset diagram. As illustrated by this example, a processing engine 1411 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1411.

In the illustrated example, an input from above can include a partial sum, p_in, provided either from another processing engine 1411 or from a previous round of computation by the processing engine array 1410. When starting a computation for a new set of input data, the top row of the processing engine array 1410 can receive a fixed value for p_in, such as zero. As illustrated by this example, i and w are multiplied together and the result is summed with p_in to produce a new partial sum, p_out, which can be input into another processing engine 1411. Various other implementations of the processing engine 1411 are possible.

Outputs from the last row in the processing engine array 1410 can be temporarily stored in the results buffer 1412. The results can be intermediate results, which can be written to the memory banks 1414 to be provided to the processing engine array 1410 for additional computation. Alternatively, the results can be final results, which, once written to the memory banks 1414 can be read from the memory subsystem 1404 over the communication fabric 1420, to be output by the system.

In some implementations, the accelerator 1402 includes an activation engine 1416. In these implementations, the activation engine 1416 can combine the results from the processing engine array 1410 into one or more output activations. For example, for a convolutional neural network, convolutions from multiple channels can be summed to produce an output activation for a single channel. In other examples, accumulating results from one or more columns in the processing engine array 1410 may be needed to produce an output activation for a single node in the neural network. In some examples, activation engine 1416 can be bypassed.

In various examples, the activation engine 1416 can include multiple separate execution channels. In these examples, the execution channels can correspond to the columns of the processing engine array 1410, and can perform an operation on the outputs of a column, the result of which can be stored in the memory subsystem 1404. In these examples, the activation engine 1416 may be able to perform between 1 and n parallel computations, where n is equal to the number of columns in the processing engine array 1410. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 1402 can include a pooling engine 1418. Pooling is the combining of outputs of the columns of the processing engine array 1410. Combining can include for example, computing a maximum value, a minimum value, an average value, a median value, a summation, a multiplication, or another logical or mathematical combination. In various examples, the pooling engine 1418 can include multiple execution channels that can operating on values from corresponding columns of the processing engine array 1410. In these examples, the pooling engine 1418 may be able to perform between 1 and n parallel computations, where n is equal to the number of columns in the processing engine array 1410. In various examples, execution channels of the pooling engine 1418 can operate in parallel and/or simultaneously. In some examples, the pooling engine 1418 can be bypassed.

Herein, the activation engine 1416 and the pooling engine 1418 may be referred to collectively as execution engines. The processing engine array 1410 is another example of an execution engine. Another example of an execution engine is a Direct Memory Access (DMA) engine, which may be located outside the accelerator 1402.

Input data 1450 can arrive over the communication fabric 1420. The communication fabric 1420 can connect the accelerator 1402 to other components of a processor, such as a DMA engine that can obtain input data 1450 from an Input/Output (I/O) device, a storage drive, or a network interface. The input data 1450 can be, for example one-dimensional data, such as a character string or numerical sequence, or two-dimensional data, such as an array of pixel values for an image or frequency and amplitude values over time for an audio signal. In some examples, the input data 1450 can be three-dimensional, as may be the case with, for example, the situational information used by a self-driving car or virtual reality data. In some implementations, the memory subsystem 1404 can include a separate buffer for the input data 1450. In some implementations, the input data 1450 can be stored in the memory banks 1414 when the accelerator 1402 receives the input data 1450.

In some examples, the accelerator 1402 can implement a neural network processing engine. In these examples, the accelerator 1402, for a set of input data 1450, can execute a neural network to perform a task for which the neural network was trained. Executing a neural network on a set of input data can be referred to as inference or performing inference.

The weights for the neural network can be stored in the memory subsystem 1404, along with input data 1450 on which the neural network will operate. The neural network can also include instructions, which can program the processing engine array 1410 to perform various computations on the weights and the input data. The instructions can also be stored in the memory subsystem 1404, in the memory banks 1414 or in a separate instruction buffer. The processing engine array 1410 can output intermediate results, which represent the outputs of individual layers of the neural network. In some cases, the activation engine 1416 and/or pooling engine 1418 may be enabled for computations called for by certain layers of the neural network. The accelerator 1402 can store the intermediate results in the memory subsystem 1404 for inputting into the processing engine array 1410 to compute results for the next layer of the neural network. The processing engine array 1410 can further output final results from a last layer of the neural network. The final results can be stored in the memory subsystem 1404 and then be copied out to host processor memory or to another location.

Figure 15:
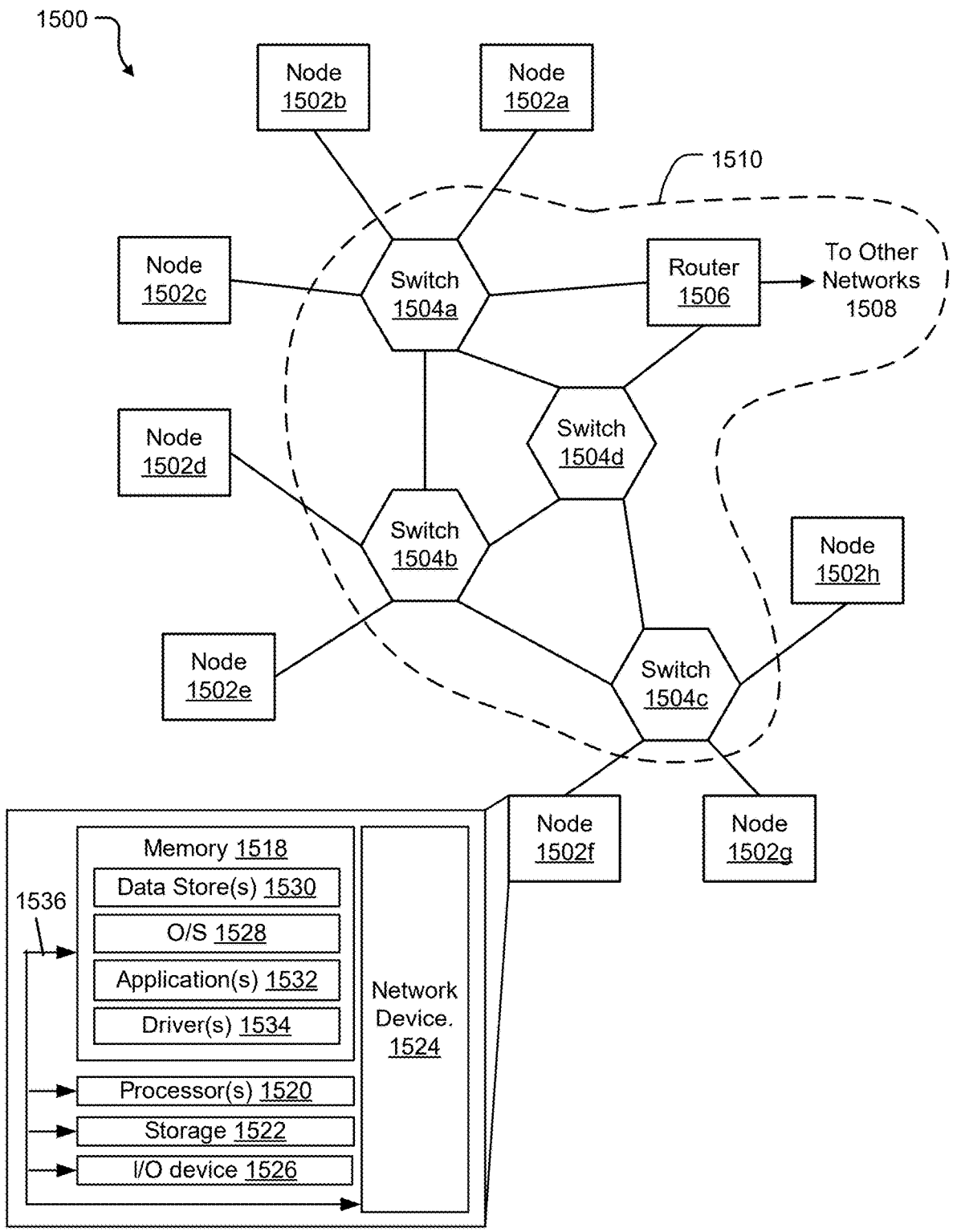
FIG. 15 includes a diagram of an example network.

FIG. 15 includes a diagram of an example network 1500, which can include one or more host systems, such as the host system illustrated in FIG. 12. For example, the example network 1500 of FIG. 15 includes multiple nodes 1502a-1502h, one or more of which can be a host system such as is illustrated in FIG. 12. Others of the nodes 1502a-1502h can be other computing devices, each of which include at least a memory for storing program instructions, a processor for executing the instructions, and a network interface for connecting to the network 1500.

In various examples, the network 1500 can be used to process data. For example, input data can be received at one of the nodes 1502a-1502h or from other networks 1508 with which the network 1500 can communicate. In this example, the input data can be directed to a node in the network 1500 that includes an acceleration engine, for the acceleration engine to operate on and produce a result. The result can then be transferred to the node or other network from which the input data was received. In various examples, input data can be accumulated from various sources, including one or more of the nodes 1502a-1502h and/or computing devices located in the other networks 1508, and the accumulated input data can be directed to one or more host systems in the network 1500. Results from the host systems can then be distributed back to the sources from which the input data was gathered.

In various examples, one or more of the nodes 1502a-1502h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 15, the nodes 1502a-1502h are connected to one another using a switched architecture with point-to point links. The switched architecture includes multiple switches 1504a-1504d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 1504a-1504d of FIG. 15 may be connected to the nodes 1502a-1502h and provide multiple paths between any two nodes.

The network 1500 may also include one or more network devices for connection with other networks 1508, such as a router 1506. Routers use headers and forwarding tables to determine the best path for forwarding the packets, and use protocols such as internet control message protocol (ICMP) to communicate with each other and configure the best route between any two devices. The router 1506 of FIG. 15 can be used to connect to other networks 1508 such as subnets, LANs, wide area networks (WANs), and/or the Internet.

In some examples, network 1500 may include any one or a combination of many different types of networks, such as cable networks, the Internet, wireless networks, cellular networks and other private and/or public networks. The interconnected switches 1504a-1504d and the router 1506, if present, may be referred to as a switch fabric 1510, a fabric, a network fabric, or simply a network. In the context of a computer network, terms "fabric" and "network" may be used interchangeably herein.

The nodes 1502a-1502h may be any combination of host systems, processor nodes, storage subsystems, and I/O chassis that represent user devices, service provider computers or third party computers.

User devices may include computing devices to access an application 1532 (e.g., a web browser or mobile device application). In some aspects, the application 1532 may be hosted, managed, and/or provided by a computing resources service or service provider. The application 1532 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1508. Additionally, the user device(s) may be part of the distributed system managed by, controlled by, or otherwise part of the service provider computer(s) (e.g., a console device integrated with the service provider computers).

The node(s) of FIG. 15 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1532 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1502a-1502h may include at least one memory 1518 and one or more processing units (or processor(s) 1520). The processor(s) 1520 may be implemented in hardware, computer-executable instructions, firmware, or combinations thereof. Computer-executable instruction or firmware implementations of the processor(s) 1520 may include computer-executable or machine-executable instructions written in any suitable programming language to perform the various functions described.

In some instances, the hardware processor(s) 1520 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1518 may store program instructions that are loadable and executable on the processor(s) 1520, as well as data generated during the execution of these programs. Depending on the configuration and type of the node(s) 1502a-1502h, the memory 1518 may be volatile (such as RAM) and/or non-volatile (such as ROM, flash memory, etc.). The memory 1518 may include an operating system 1528, one or more data stores 1530, one or more application programs 1532, one or more drivers 1534, and/or services for implementing the features disclosed herein.

The operating system 1528 may support nodes 1502a-1502h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, IOS, Android, and the like. The operating system 1528 may also be a proprietary operating system.

The data stores 1530 may include permanent or transitory data used and/or operated on by the operating system 1528, application programs 1532, or drivers 1534. Examples of such data include web pages, video data, audio data, images, user data, and so on. The information in the data stores 1530 may, in some implementations, be provided over the network(s) 1508 to user devices. In some cases, the data stores 1530 may additionally or alternatively include stored application programs and/or drivers. Alternatively or additionally, the data stores 1530 may store standard and/or proprietary software libraries, and/or standard and/or proprietary application user interface (API) libraries. Information stored in the data stores 1530 may be machine-readable object code, source code, interpreted code, or intermediate code.

The drivers 1534 include programs that may provide communication between components in a node. For example, some drivers 1534 may provide communication between the operating system 1528 and additional storage 1522, network device 1524, and/or I/O device 1526. Alternatively or additionally, some drivers 1534 may provide communication between application programs 1532 and the operating system 1528, and/or application programs 1532 and peripheral devices accessible to the service provider computer. In many cases, the drivers 1534 may include drivers that provide well-understood functionality (e.g., printer drivers, display drivers, hard disk drivers, Solid State Device drivers). In other cases, the drivers 1534 may provide proprietary or specialized functionality.

The service provider computer(s) or servers may also include additional storage 1522, which may include removable storage and/or non-removable storage. The additional storage 1522 may include magnetic storage, optical disks, solid state disks, flash memory, and/or tape storage. The additional storage 1522 may be housed in the same chassis as the node(s) 1502a-1502h or may be in an external enclosure. The memory 1518 and/or additional storage 1522 and their associated computer-readable media may provide non-volatile storage of computer-readable instructions, data structures, program modules, and other data for the computing devices. In some implementations, the memory 1518 may include multiple different types of memory, such as SRAM, DRAM, or ROM.

The memory 1518 and the additional storage 1522, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1518 and the additional storage 1522 are examples of computer storage media. Additional types of computer storage media that may be present in the node(s) 1502a-1502h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1502a-1502h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1502a-1502h may also include I/O device(s) 1526, such as a keyboard, a mouse, a pen, a voice input device, a touch input device, a display, speakers, a printer, and the like. The node(s) 1502a-1502h may also include one or more communication channels 1536. A communication channel 1536 may provide a medium over which the various components of the node(s) 1502a-1502h can communicate. The communication channel or channels 1536 may take the form of a bus, a ring, a switching fabric, or a network.

The node(s) 1502a-1502h may also contain network device(s) 1524 that allow the node(s) 1502a-1502h to communicate with a stored database, another computing device or server, user terminals and/or other devices on the network(s) 1500.

In some implementations, the network device 1524 is a peripheral device, such as a PCI-based device. In these implementations, the network device 1524 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 1524 may be connected to a computing system using a PCIe interface.

A PCI-based device may include one or more functions. A "function" describes operations that may be provided by the network device 1524. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1524 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer-readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for aligning tensors for execution of a bidirectional recurrent neural network (RNN) on a data-flow centric processor, the method comprising:
   compiling the bidirectional RNN for a user-specified length (L), the bidirectional RNN having a forward network, a reverse network, a first transformation layer, and a second transformation layer, wherein the forward network performs a set of operations in a forward direction and the reverse network performs the set of operations in a reverse direction; and
   during runtime and while performing an inference using the data-flow centric processor:
      determining a number of runtime steps (N), based on the inference;
      providing an input tensor to the bidirectional RNN network;
      generating, using the forward network and based on the input tensor, a forward output tensor;
      performing, using the first transformation layer, a first transformation on the input tensor to generate a transformed input tensor, wherein performing the first transformation using the first transformation layer includes modifying an order of the input tensor by reversing an order of only a first N values of the input tensor, the input tensor having a length greater than N;
      generating, using the reverse network and based on the transformed input tensor, a reverse output tensor;
      performing, using the second transformation layer, a second transformation on the reverse output tensor to generate a transformed output tensor, wherein performing the second transformation includes modifying an order of a first N values of the reverse output tensor; and
      combining the forward output tensor and the transformed output tensor to produce an output tensor.

2. The method of claim 1, wherein modifying the order of the first N values of the reverse input tensor includes:
   reversing the order of the first N values of the reverse output tensor.

3. The method of claim 1, wherein performing the first transformation further includes:
   setting the last L-N values of the input tensor to zero.

4. The method of claim 1, further comprising:
   during runtime and while performing the inference:
      determining that N is equal to or less than L.

5. A method comprising:
   providing an input to a bidirectional network, the bidirectional network having a forward network and a reverse network, wherein the forward network performs a set of operations in a forward direction and the reverse network performs the set of operations in a reverse direction;
   generating, using the forward network and based on the input, a forward output;
   performing, using a first transformation layer of the bidirectional network, a first transformation on the input to generate a transformed input, wherein performing the first transformation using the first transformation layer includes modifying an order of the input by reversing an order of only a first N values of the input tensor, the input tensor having a length greater than N;
   generating, using the reverse network and based on the transformed input, a reverse output; and
   performing, using a second transformation layer of the bidirectional network, a second transformation on the reverse output to generate a transformed output, wherein performing the second transformation includes modifying an order of a set of values of the reverse output.

6. The method of claim 5, further comprising:
   combining the forward output and the transformed output to produce an output.

7. The method of claim 5, further comprising:
   determining a number of runtime steps based on the input.

8. The method of claim 5, wherein modifying the order of the input includes:
   transposing the first N values of the input.

9. The method of claim 5, wherein modifying the order of the reverse output includes:
   reversing the order of the set of values of the reverse output.

10. The method of claim 5, wherein performing the first transformation further includes:
    setting a last set of values of the input to zero.

11. The method of claim 5, wherein performing the second transformation further includes:
    overwriting a last set of values of the reverse output with zeros.

12. A non-transitory computer-readable medium having stored therein instructions that, when executed by one or more processors cause the one or more processors to perform operations including:
    providing an input to a bidirectional network, the bidirectional network having a forward network and a reverse network, wherein the forward network performs a set of operations in a forward direction and the reverse network performs the set of operations in a reverse direction;
    generating, using the forward network and based on the input, a forward output;
    performing, using a first transformation layer of the bidirectional network, a first transformation on the input to generate a transformed input, wherein performing the first transformation using the first transformation layer includes modifying an order of the input by reversing an order of only a first N values of the input tensor, the input tensor having a length greater than N;
    generating, using the reverse network and based on the transformed input, a reverse output; and performing, using a second transformation layer of the bidirectional network, a second transformation on the reverse output to generate a transformed output, wherein performing the second transformation includes modifying an order of a set of values of the reverse output.

13. The non-transitory computer-readable medium of claim 12, wherein the operations further comprise:
combining the forward output and the transformed output to produce an output.

14. The non-transitory computer-readable medium of claim 12, wherein the operations further comprise:
determining a number of runtime steps based on the input.

15. The non-transitory computer-readable medium of claim 12, wherein modifying the order of the set of values of the reverse output includes:
reversing the order of the set of values of the reverse output.

16. The non-transitory computer-readable medium of claim 12, wherein performing the first transformation further includes:
setting a last set of values of the input to zero.

17. The non-transitory computer-readable medium of claim 12, wherein performing the second transformation further includes:
overwriting a last set of values of the reverse output with zeros.

* * * * *